(12) United States Patent
Tsou

(10) Patent No.: US 8,100,651 B2
(45) Date of Patent: Jan. 24, 2012

(54) STABILIZING APPARATUS FOR VERTICAL AXIS WIND TURBINE

(76) Inventor: Kuei-Sheng Tsou, Hsinchu (TW)

( * ) Notice: Subject to any disclaimer, the term of this patent is extended or adjusted under 35 U.S.C. 154(b) by 883 days.

(21) Appl. No.: 12/144,643

(22) Filed: Jun. 24, 2008

(65) Prior Publication Data

US 2009/0317251 A1     Dec. 24, 2009

(51) Int. Cl.
*F03D 7/06*     (2006.01)
*F03D 9/00*     (2006.01)
*F03D 7/00*     (2006.01)

(52) U.S. Cl. .............................. 416/55; 415/4.2; 290/55

(58) Field of Classification Search .................... 416/50, 416/51, 145, 197 A; 290/55, 44, 54; 415/4.2, 415/119
See application file for complete search history.

(56) References Cited

U.S. PATENT DOCUMENTS 3,970,409 A * 7/1976 Luchuk .......................... 416/145

* cited by examiner

*Primary Examiner* — Thomas L Dickey
*Assistant Examiner* — Nikolay Yushin

(57) ABSTRACT

A stabilizing apparatus for a vertical axis wind turbine (VAWT) includes at least two rolling units, at least two guiding units and at least an engaging unit engaged with the guiding units to fix the relative position among the guiding units. The guiding units are symmetrically extending from the center area of the apparatus to the outer edge of the circumference of the apparatus with a housing space formed inside each guiding unit. The rolling units are uniformly housed inside the housing space of the guiding units. The inner wall of the bottom of the housing space inside the guiding unit forms a guiding track extending from the center of the apparatus to the edge of the circumference of the apparatus. The straight line connecting the starting and the ending points of the guiding track forms an angle of 0-45° to the horizon surface.

21 Claims, 15 Drawing Sheets

STABILIZING APPARATUS FOR VERTICAL AXIS WIND TURBINE

FIELD OF THE INVENTION

The present invention generally relates to a stabilizing apparatus for a vertical axis wind turbine (VAWT), and more specifically to an apparatus for automatically changing rotational inertia of the wind turbine rotor to reduce the vibration and shaking of the wind turbine rotor caused by turbulence during rotation, and to stabilize and maintain the rotor rotation speed.

BACKGROUND OF THE INVENTION

Vertical axis wind turbine (VAWT) uses the wind turbine rotor with multiple blades and an axis perpendicular to the ground. The main advantage of VAWT is that VAWT can extract energy of wind streaming from any directions; therefore, VAWT performs better in turbulence than horizontal axis wind turbine (HAWT).

Wind turbine rotor is one of the most important components of VAWT. The blade geometry of the wind turbine rotor will directly affect the power efficiency of VAWT. The wind turbine rotor with higher rotational inertia is better at reducing the shaking and vibration of the wind turbine rotor caused by the turbulence while requiring a higher wind speed and torque for starting and activating. On the other hand, the wind turbine rotor with lower rotational inertia is easily affected by turbulence on the rotation stability while the advantage is easy to activate.

The theoretic value of the equivalent rotational inertia is $$I = \frac{1}{2}MR^2$$

or $I=MR^2$, where M is the mass of wind turbine rotor, and R is the radius of the wind turbine rotor.

Therefore, increasing the rotational inertia of the wind turbine rotor can be achieved by increasing the mass or the radius of the wind turbine rotor. However, VAWT needs a higher start-up wind speed for the wind turbine rotor with a bigger mass. And, increasing the radius of the wind turbine rotor will cause constraint to VAWT products designed for applications. Therefore, it is imperative to devise a stabilizing apparatus to be used with the original design and structure of a wind turbine rotor so as to automatically change the rotational inertia of the wind turbine rotor to achieve the objectives of requiring a lower start-up wind speed, and maintaining and stabilizing the rotor rotation speed.

SUMMARY OF THE INVENTION

The primary objective of the present invention is to provide a stabilizing apparatus for vertical axis wind turbine (VAWT). The apparatus is installed on the same axis as the wind turbine rotor of the VAWT, and the two rotate synchronously around the same axis. The main feature of the apparatus is that the rotational inertia of the apparatus can be changed by rotor speed. The apparatus includes a plurality of rolling units. The rolling units can move from the center outward to the circumference of the apparatus due to the centripetal force caused by the rotation of the apparatus. Therefore, when the apparatus starts rotation by the wind, the distance between the rolling units and the center of the rotation axis increases; hence, the rotational inertia of the apparatus is increased. Because the apparatus and the wind turbine rotor can be integrated together and rotate synchronously, the overall rotational inertia of the wind turbine rotor is also changed accordingly. When the rotation speed of wind turbine rotor is increasing, the rotational inertia of rotor system is also increasing until the rolling units are all on the edge of the circumference of the apparatus to obtain maximum rotational inertia of the rotor system, so as to achieve the objectives of reducing the vibration and shaking of the wind turbine rotor caused by turbulence during rotation, and maintaining and stabilizing the rotor rotation speed.

Another objective of the present invention is to provide a stabilizing apparatus having a wide range of applications. Because the apparatus of the present invention is capable of automatically changing the rotational inertia without changing the original design and structure of the wind turbine rotor of the VAWT, the apparatus of the present invention is easier to be integrated with the current wind turbine rotor of VAWT.

Yet another objective of the present invention is to provide a stabilizing apparatus to be installed at the top, bottom, or the shaft body between the top and the bottom of a wind turbine rotor. The present invention can also be installed and integrated between two wind turbine rotors when a plurality of wind turbine rotors are stacked so as to obtain higher torque.

To achieve the above objectives, the present invention provides a stabilizing apparatus for VAWT, including at least two rolling units, at least two guiding units and at least an engaging unit. The rolling units are balls with proper weight, such as metal balls. The guiding units are symmetrically extending from the center of the apparatus to the outer edge of the circumference of the apparatus with a housing space formed inside each guiding unit. The rolling units are uniformly housed inside the housing spaces of the guiding units. The inner wall of the bottom of the housing space inside the guiding unit forms a guiding track. The guiding track also extends along with guiding units from the center of the apparatus towards the edge of the circumference of the apparatus. The straight line connecting the center starting and the outer ending points of the guiding track forms an angle of 0-45° to the horizon surface. The engaging unit is engaged with the guiding units to fix the relative position among the guiding units. When the apparatus starts rotating with the wind turbine rotor by wind, the rolling units are closer to the center initially; therefore, the rotor system has smaller rotational inertia. When the rotation speed increases, the rolling units are moved by the centripetal force so that the rotational inertia also increases and the wind turbine rotor can rotate more stably.

The foregoing and other objectives, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
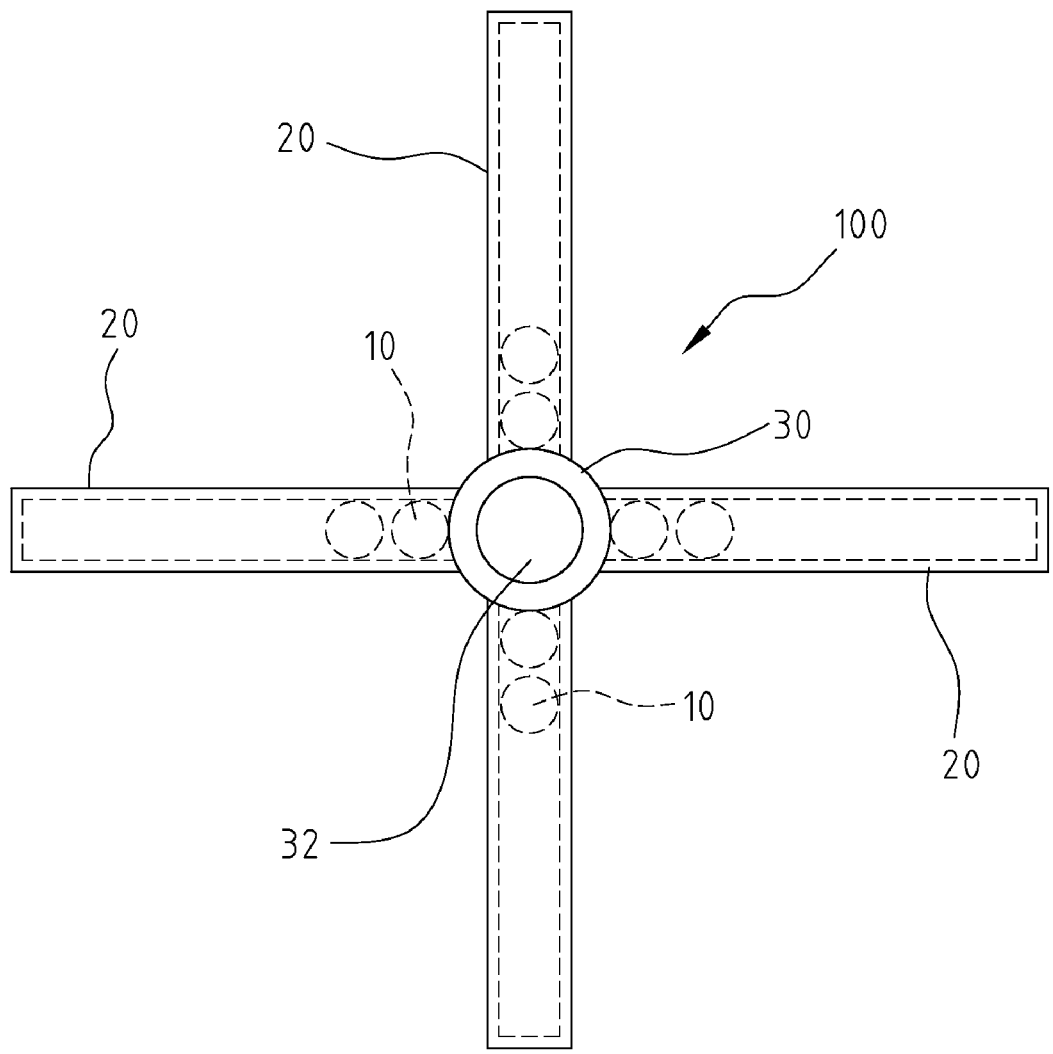
FIG. 1 shows a top view of the first embodiment according to the invention.
Figure 2:
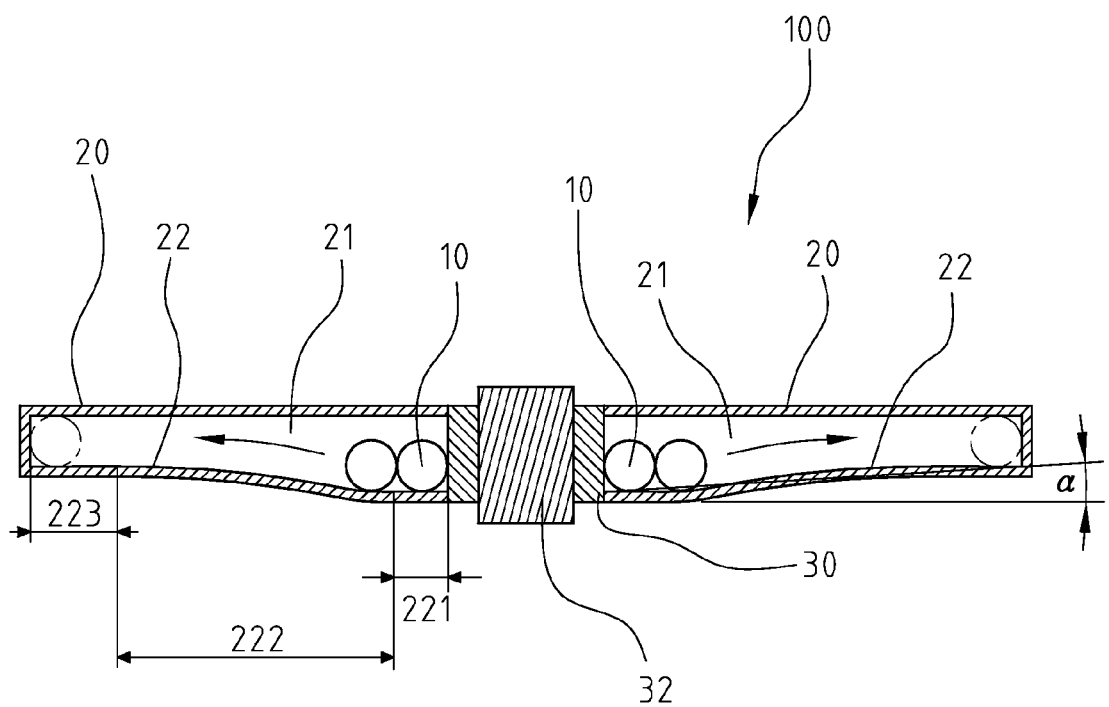
FIG. 2 shows a cross-sectional view of the structure shown in FIG. 1.

FIGS. 1 and 2 show a top-view and a cross-sectional view of a stabilizing apparatus of the present invention respectively. The apparatus of the present invention is to be installed with the wind turbine rotor of the VAWT and shares the same axis as the wind turbine rotor. Apparatus 100 includes at least two rolling units 10, at least two guiding units 20 and at least an engaging unit 30. Guiding units 20 are arranged symmetrically extending from the center of apparatus 100 outward to the edge of the circumference of apparatus 100, and a housing space 21 is formed inside each guiding unit 20. The circumference referred to in the present invention is the virtual circle formed by the outer edge of guiding units 20 when rotating. Rolling units 10 are uniformly distributed in housing spaces 21 of guiding units 20. Engaging unit 30 is engaged with guiding units 20 to fix the relative positions among guiding units 20. The inner wall of the bottom of housing space 21 inside guiding unit 20 forms a guiding track 22. Guiding track 22 also extends from the center of apparatus 100 towards the edge of the circumference of apparatus 100. The straight line connecting the center starting and the outer ending points of guiding track 22 forms an angle α of 0-45° to the horizon surface. When apparatus 100 starts to rotate because the wind turbine rotor is rotated by wind, rolling units 10 will roll along guiding track 22 towards the edge of the circumference of apparatus 100 because of the centripetal force. The movement distance of rolling units 10 depends on the magnitude of the centripetal force and the angle α of guiding track 22. The movement distance of rolling units 10 will change the rotational inertia of apparatus 100 and the overall wind turbine rotor to achieve the objectives of lower wind speed start and activation as well as stabilizing rotation of the wind turbine rotor, including stabilizing and maintaining the rotation speed of the wind turbine rotor and stabilizing the possible vibration caused by turbulence.

The following describes the components of the present invention in details.

Rolling unit 10 is a ball with a proper weight. In the present embodiment, rolling unit 10 can be, but not limited to, a metal ball. Guiding units 20 are symmetrical and are arranged extending from the center location of apparatus 100 outward to the edge of the circumference of apparatus 100. Guiding units 20 do not pass the central point of apparatus 100 so that guiding tracks 22 inside guiding units 20 do not pass the central point of apparatus 100, either. In the present embodiment, guiding units 20 are extending from the center location of apparatus 100 outwards to the edge of the circumference of apparatus 100 in a straight line manner along the radius direction. However, guiding units 20 are not limited to the details described thereof. For example, guiding units 20 may extend along a curvy path. The inside of guiding unit 20 is a closed housing space 21. The inner wall of guiding unit 20 forms a guiding track 22, located at the bottom of housing space 21. Housing spaces 21 contain rolling units 10 for the rolling movement, and guiding tracks 22 provide the rolling track for rolling units 10. Guiding track 22 also extends along with guiding units 20 from the center location of apparatus 100 towards the edge of the circumference of apparatus 100. The straight line connecting the center starting and the outer ending points of guiding track 22 forms an angle α of 0-45° to the horizon surface. However, guiding track 22 can be of a plurality of different forms. The following describes some of the embodiments of guiding track 22 used in the present invention. Firstly, guiding track 22 can be a flat surface. In this case, the angle α is 0°. Secondly, guiding track 22 is a slant surface. In this case, the angle between the slant surface and the horizon surface is 0-45°. Thirdly, guiding track 22 is a curvy surface. In this case, the vertical cross-section view of guiding track 22 forms a monotonically increasing curve. Fourthly, guiding track 22 consists of a plurality of segments, with each segment not necessarily the same. For example, each segment can be a flat surface, a slant surface or a curvy surface. Also, even the two adjacent segments are both curvy surfaces, the two adjacent segments may have different gradients. As shown in FIG. 2, guiding track 22 includes a first segment 221, a second segment 222 and a third segment 223. First segment 221 is a flat surface, second segment 222 is a curvy surface with larger gradient, and third segment 223 is a curvy surface with smaller gradient and approaching to flat surface. Guiding track 22 is not limited to the details described thereof, and the number of the segments and the structure of guiding track can be designed to meet the requirements of the wind turbine rotor used with the VAWT.

Engaging unit 30 is to engage and fix each guiding unit 20. In the present embodiment, engaging unit 30 is a ring shape and is installed at the center area of apparatus 100. An axis 32 is installed at the center area of engaging unit 30. When assembled with the wind turbine rotor, axis 32 is also used as the rotational axis of the wind turbine rotor. The shape of engaging unit 30 is not limited to the details described thereof. For example, engaging unit 30 can be a hollow or solid cone shape, and guiding units 20 and rolling units 10 are both hidden inside the engaging unit so that the present invention would have smaller wind resistance and higher structural strength. Hence, the engaging unit of the present invention is not limited to any specific shape or structure as long as the engaging unit can engage and fix the guiding units.

Figure 3A:
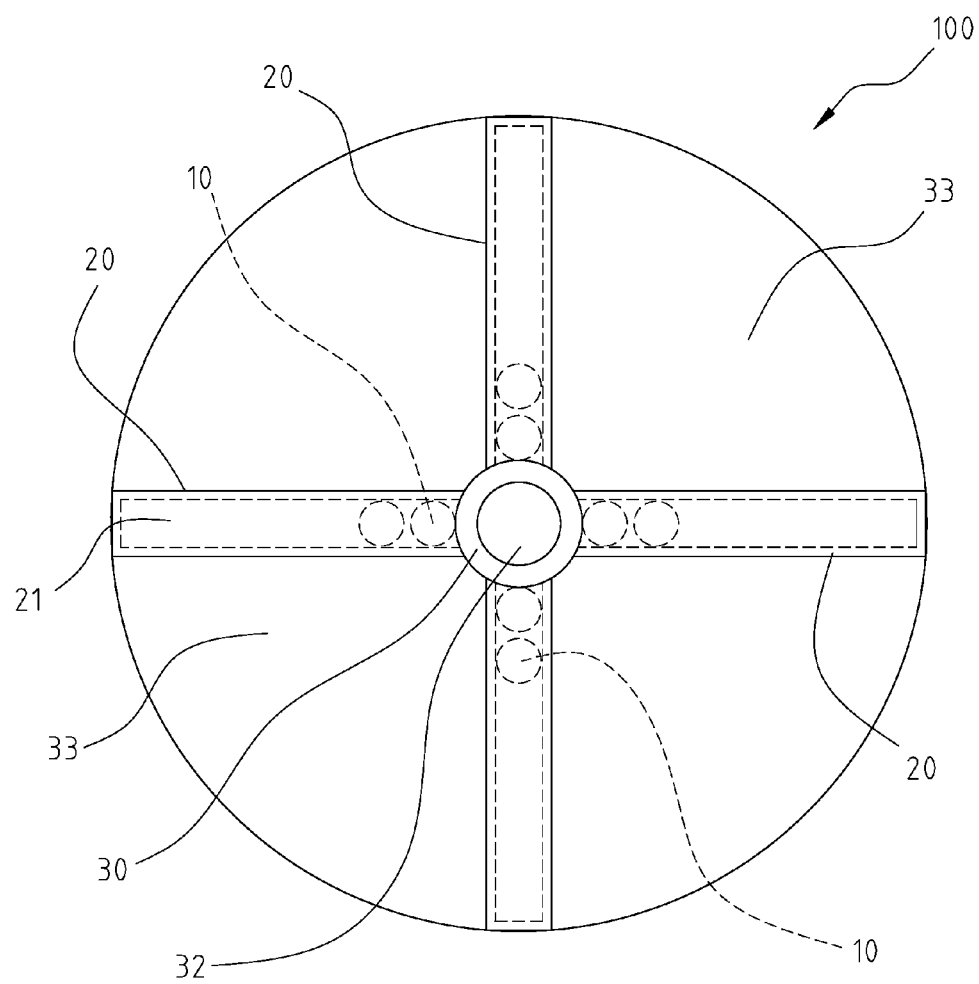
FIG. 3A shows the top view of the second embodiment of the present invention.
Figure 3B:
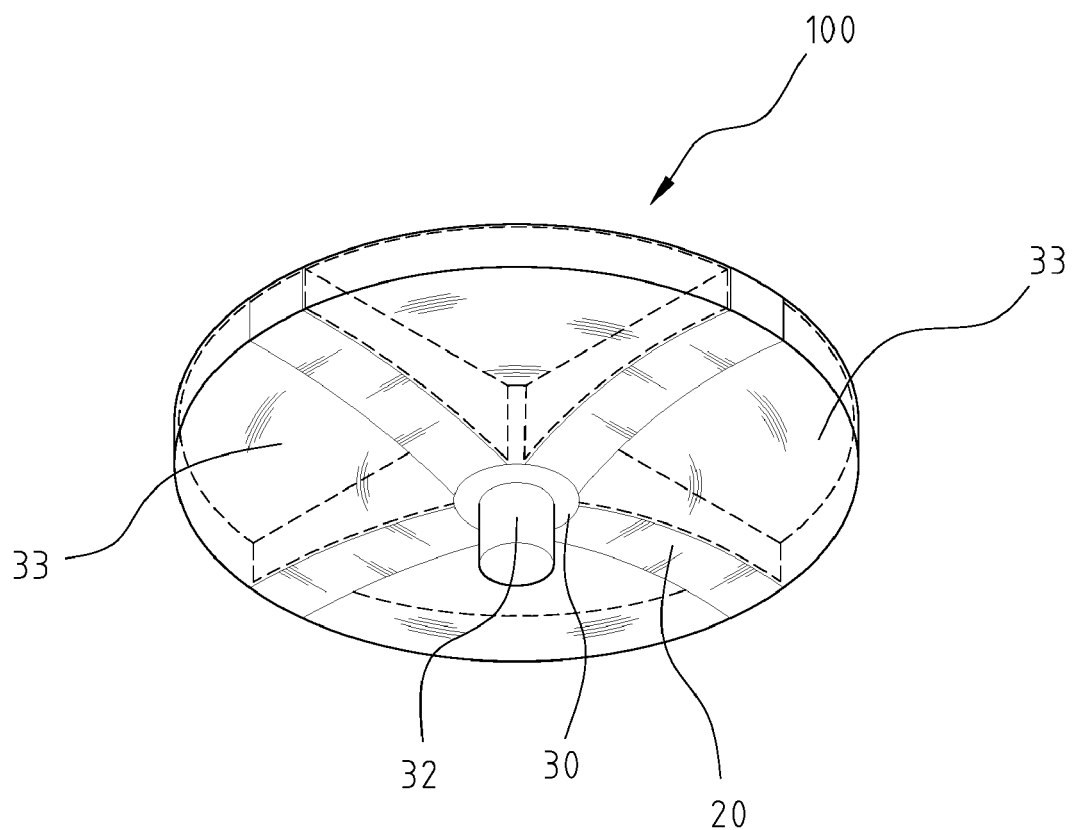
FIG. 3B shows a three-dimensional view of the second embodiment of FIG. 3A.

FIGS. 3A and 3B show the second embodiment of the present invention. In this embodiment, engaging unit 30 further includes a plurality of first fixing elements 33. Each first fixing element 33 is engaged between two adjacent guiding units 20 to fix the relative position of two adjacent guiding units 20. In the present embodiment, first fixing element 33 is shaped as a quarter of a cylinder. The cross-sectional shape matches the shape of guiding units 20. As shown in FIG. 3B, when a plurality of guiding units 20 are engaged together by engaging unit 30 and a plurality of first fixing elements 33, the overall shape has a bottom shaped as a curvy surface of a cone to reduce the wind resistance. However, the shape of the first fixing element is not limited to the details described thereof, as shown in the following descriptions.

Figure 4:
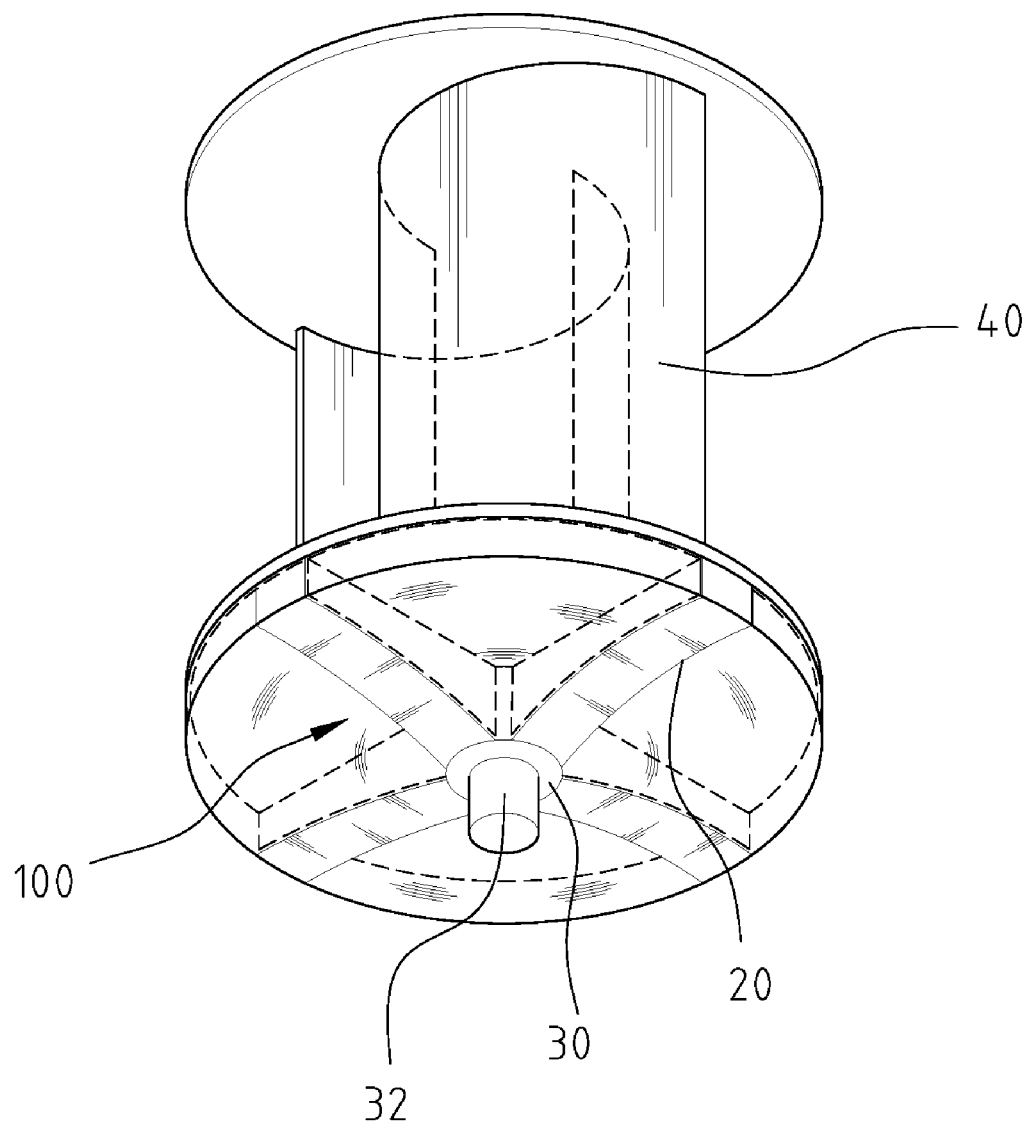
FIG. 4 shows a schematic view of the present invention in actual application with a type of wind turbine rotor of VAWT.

FIG. 4 shows a three-dimensional schematic view of the apparatus of the present invention applied to the first type of wind turbine rotor. Wind turbine rotor 40 in this embodiment shows a type of wind turbine rotor commonly found in conventional VAWT. Any other types of wind turbine rotor of VAWT can also be used in this present embodiment to operate with apparatus 100 of the present invention. In this embodiment, apparatus 100 of FIG. 3B is engaged with the bottom of wind turbine rotor 40, and the bottom of axis 32 is connected to a generator (not shown in the figure). When wind turbine rotor 40 is driven by the moving air, i.e., wind, and starts to rotate, apparatus 100 also starts to rotate synchronously. Because rolling units 10 are initially located close to the center of apparatus 100, the system has the minimum rotational inertia; therefore, the VAWT can be started by lower wind speed. As the rotation speed increases, because of the centripetal force, rolling units 10 of apparatus 100 roll from center of apparatus 100 outwards to the edge of the circumference of apparatus 100; therefore, the overall rotational inertia of the wind turbine rotor system increases so as to stabilize and maintain the rotation speed of the wind turbine rotor and reduce or eliminate the vibration caused by turbulence during wind turbine rotor rotation.

Figure 5:
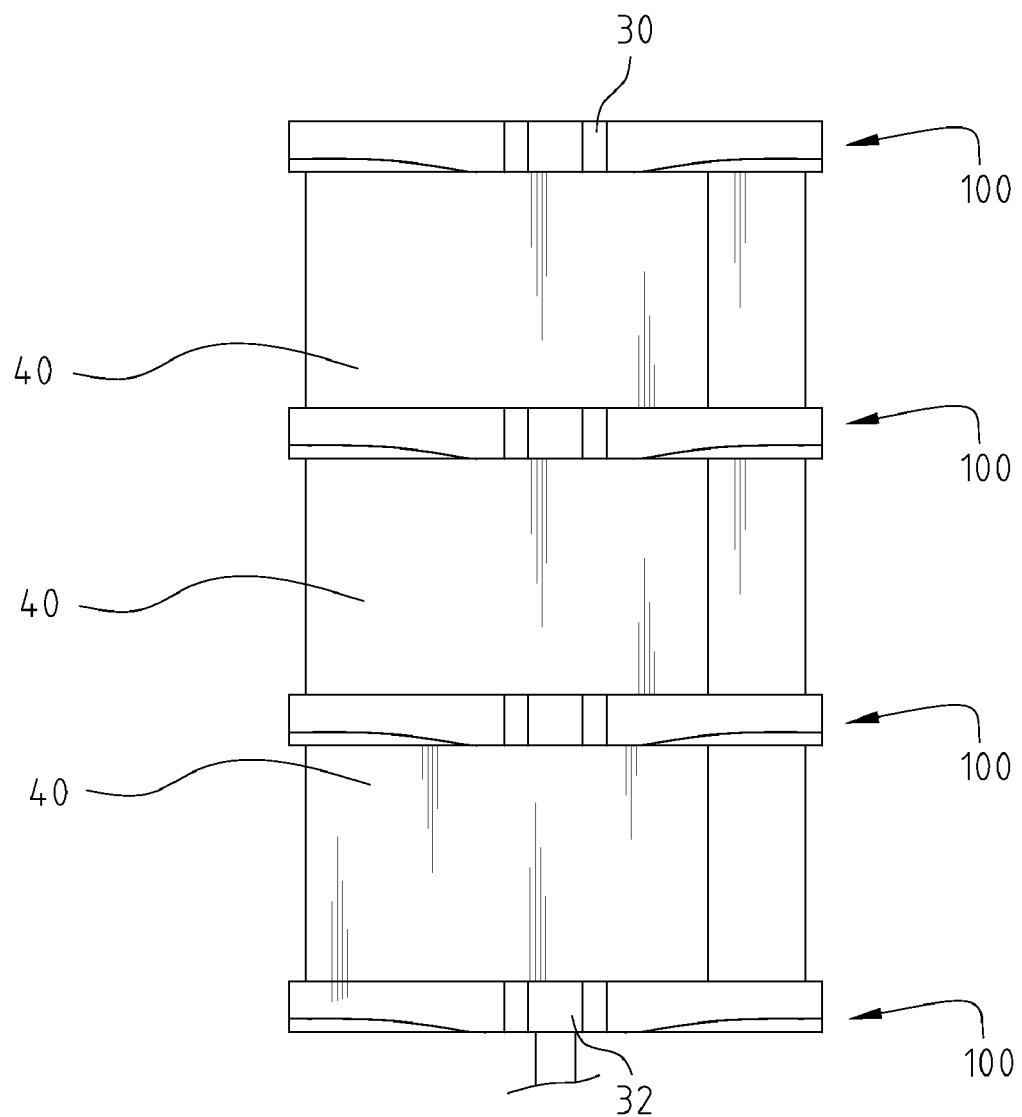
FIG. 5 shows a schematic view of the present invention in actual application with another type of wind turbine rotor of VAWT.

FIG. 5 shows a schematic view of the present invention in the second actual application. In this embodiment, wind turbine rotor 40 is the same as the wind turbine rotor of FIG. 4. However, there are four stabilizing apparatuses 100 and three wind turbine rotors in this embodiment. Apparatuses 100 and wind turbine rotors 40 are stacked in an interleaved manner. Therefore, apparatus 100 of the present invention can be installed at the top location or the bottom location of wind turbine rotor 40, or even installed between two wind turbine rotors.

Figure 6A:
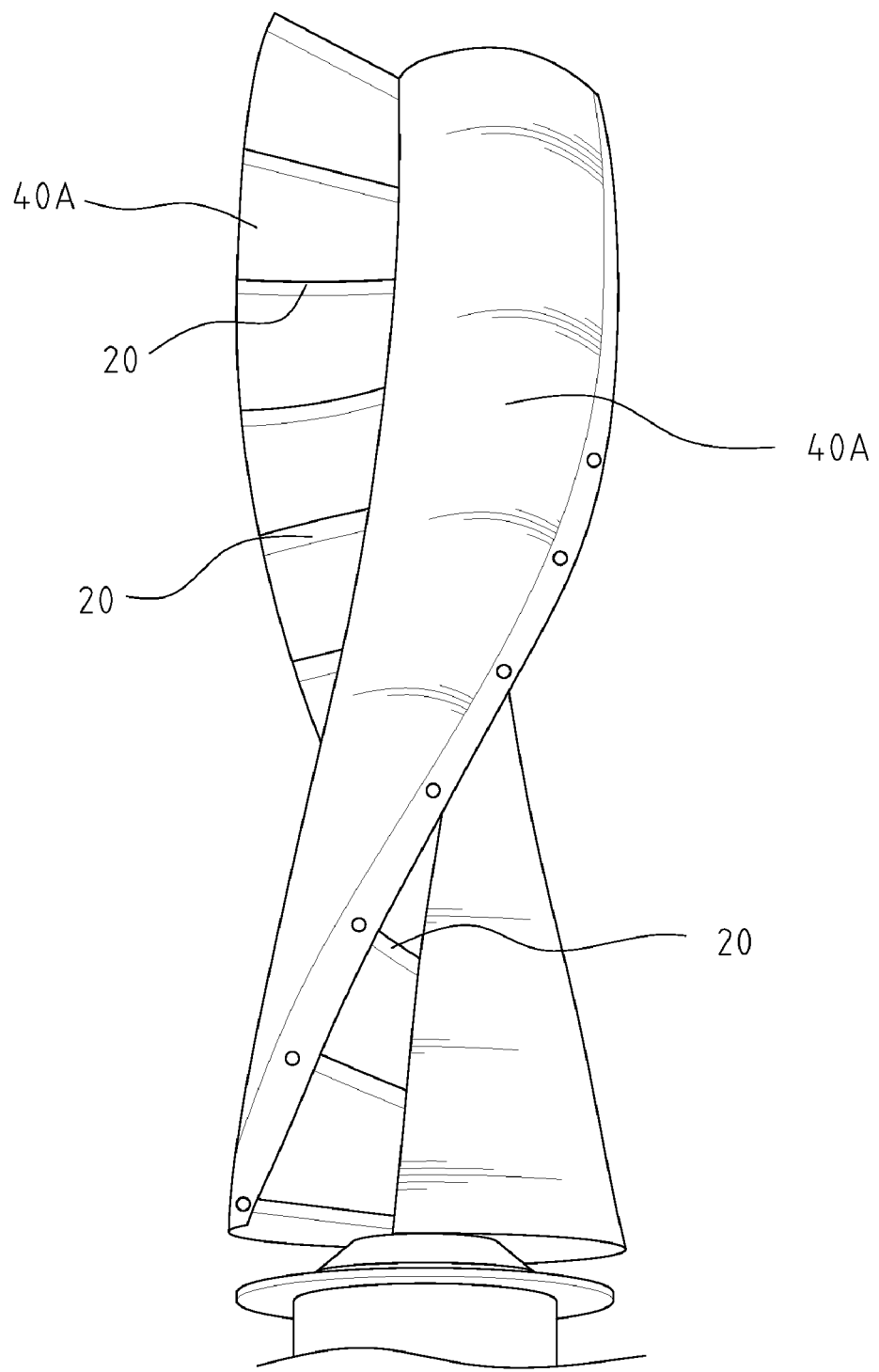
FIG. 6A shows a schematic view of the present invention in actual application with the third type of wind turbine rotor of VAWT.
Figure 6B:
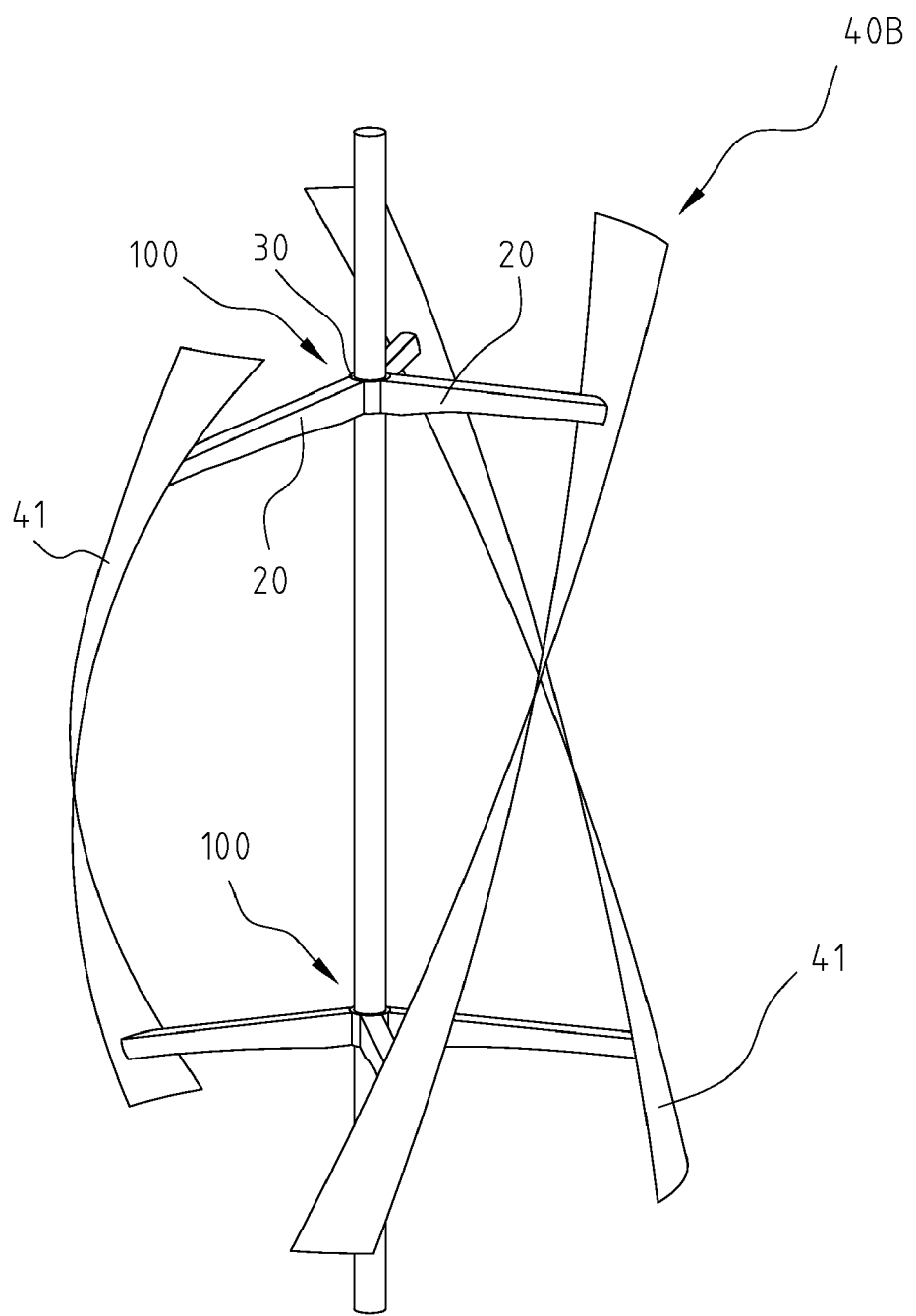
FIG. 6B shows a schematic view of the present invention in actual application with the fourth type of wind turbine rotor of VAWT.

FIG. 6A shows a schematic view of the present invention designed in the third actual application. In this embodiment, guiding units 20 of apparatus 100 are located between the top and the bottom locations of wind turbine rotor 40A. Each guiding unit 20 extends from the center location of apparatus 100 outward to the edge of the circumference of apparatus 100, and the tip of guiding unit 20 is connected to the blade edge of wind turbine rotor 40A. FIG. 6B shows a schematic view of the present invention in the fourth actual application. In this embodiment, apparatus 100 is integrated with wind turbine rotor 40B of another type. Two apparatuses 100 are used in this embodiment, located close to the top and the bottom of wind turbine rotor 40B, respectively. The outer parts of guiding units 20 of each apparatus 100 are engaged with blade 41 of wind turbine rotor 40B.

In summary, apparatus 100 of the present invention is applicable to different types of wind turbine rotors of all VAWT. Also, apparatus 100 of the present invention can be installed at the top or bottom of the wind turbine rotor as well as on the shaft between two ends of the wind turbine rotor, or even stacked between two wind turbine rotors.

Figure 7A:
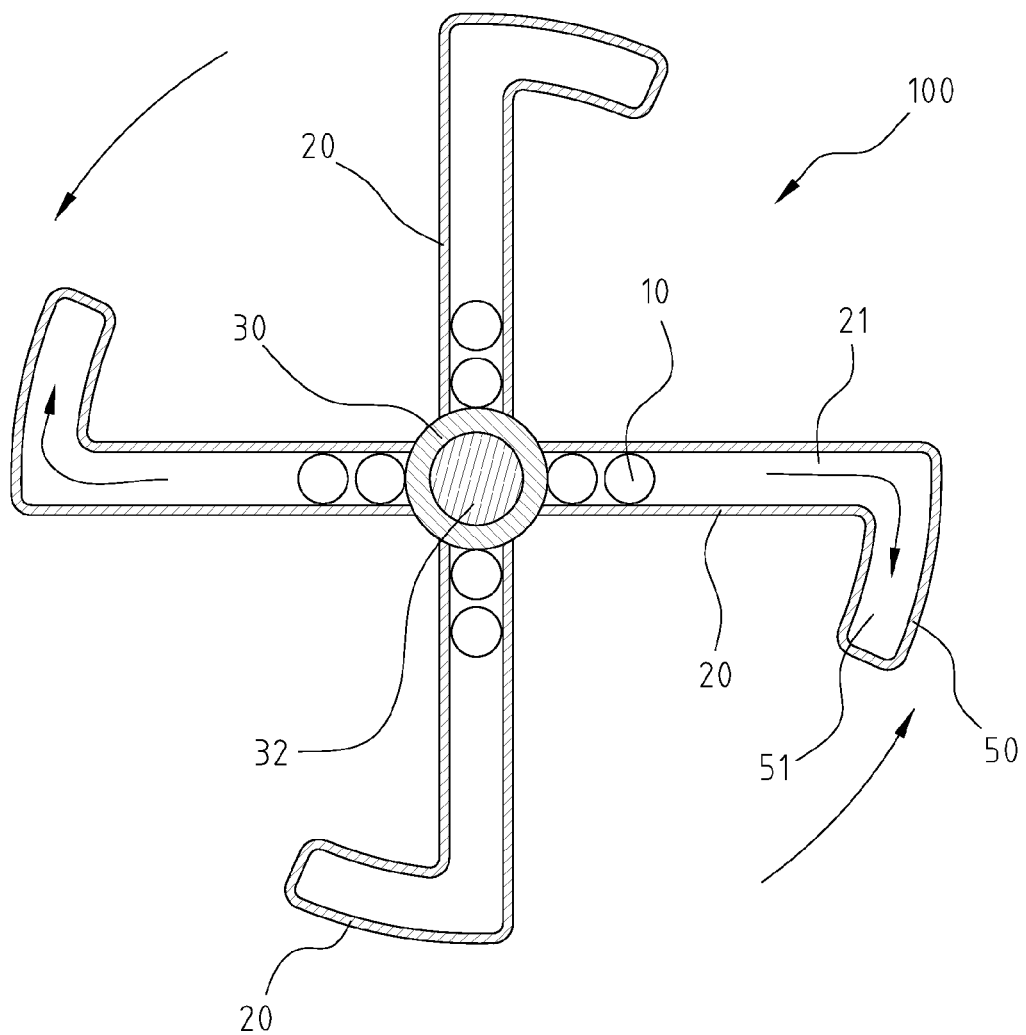
FIG. 7A shows a cross-sectional view of the third embodiment of the present invention.
Figure 7B:
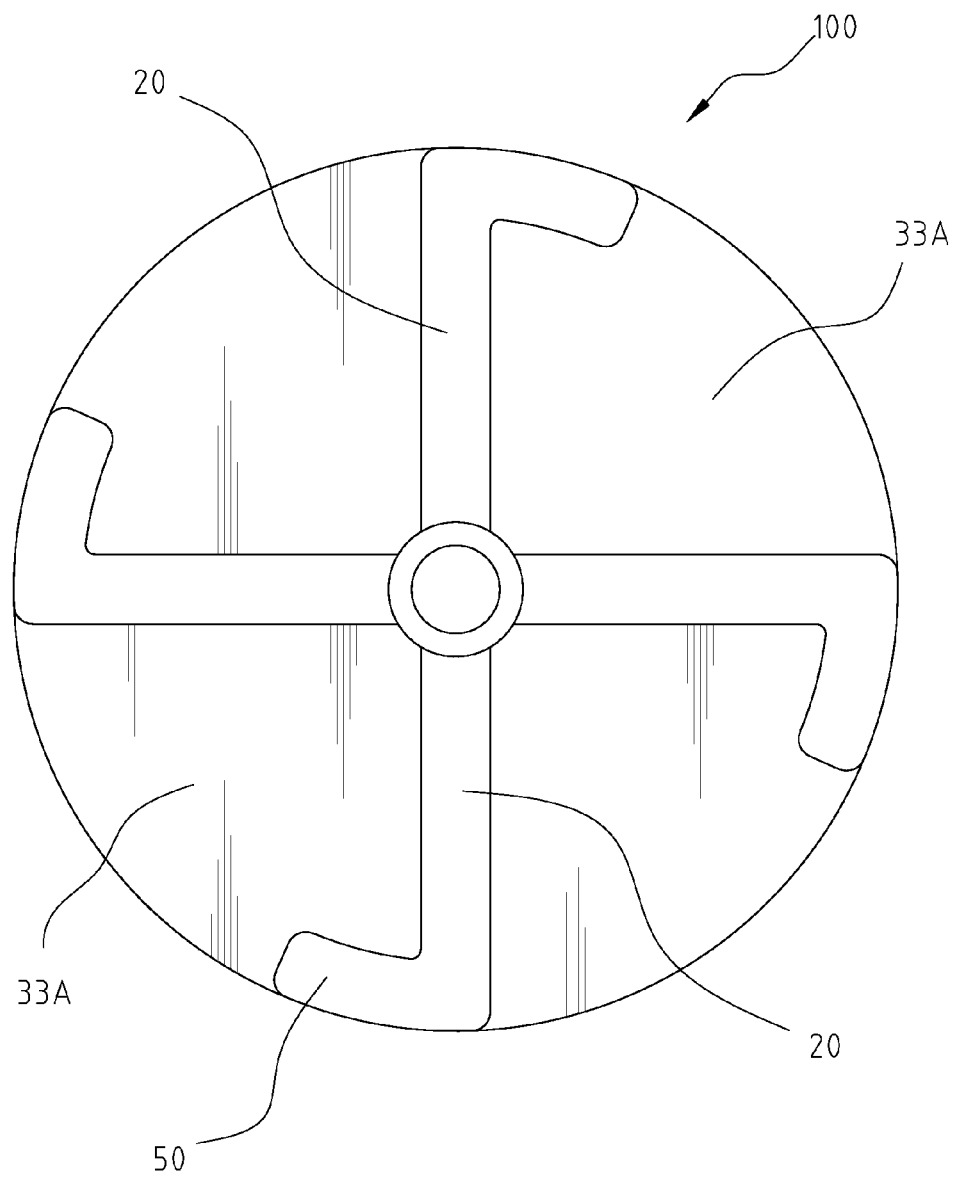
FIG. 7B shows another variety of the third embodiment of the present invention.

FIG. 7A shows the third embodiment of the present invention. In this embodiment, the end part of each guiding unit 20 further includes an extending unit 50. Extending unit 50 is arc shape with an arc space 51 inside. Arc space 51 is linked to housing space 21 of guiding unit 20 so that rolling units 10 inside guiding unit 20 can roll inside extending unit 50. FIG. 7B shows a schematic view of another embodiment of FIG. 7A. In this embodiment, engaging unit 30 further includes a plurality of fixing elements 33A. First fixing element 33A is engaged between two adjacent guiding units 20 and extending units 50 to enhance the overall structural strength of apparatus 100.

Figure 8:
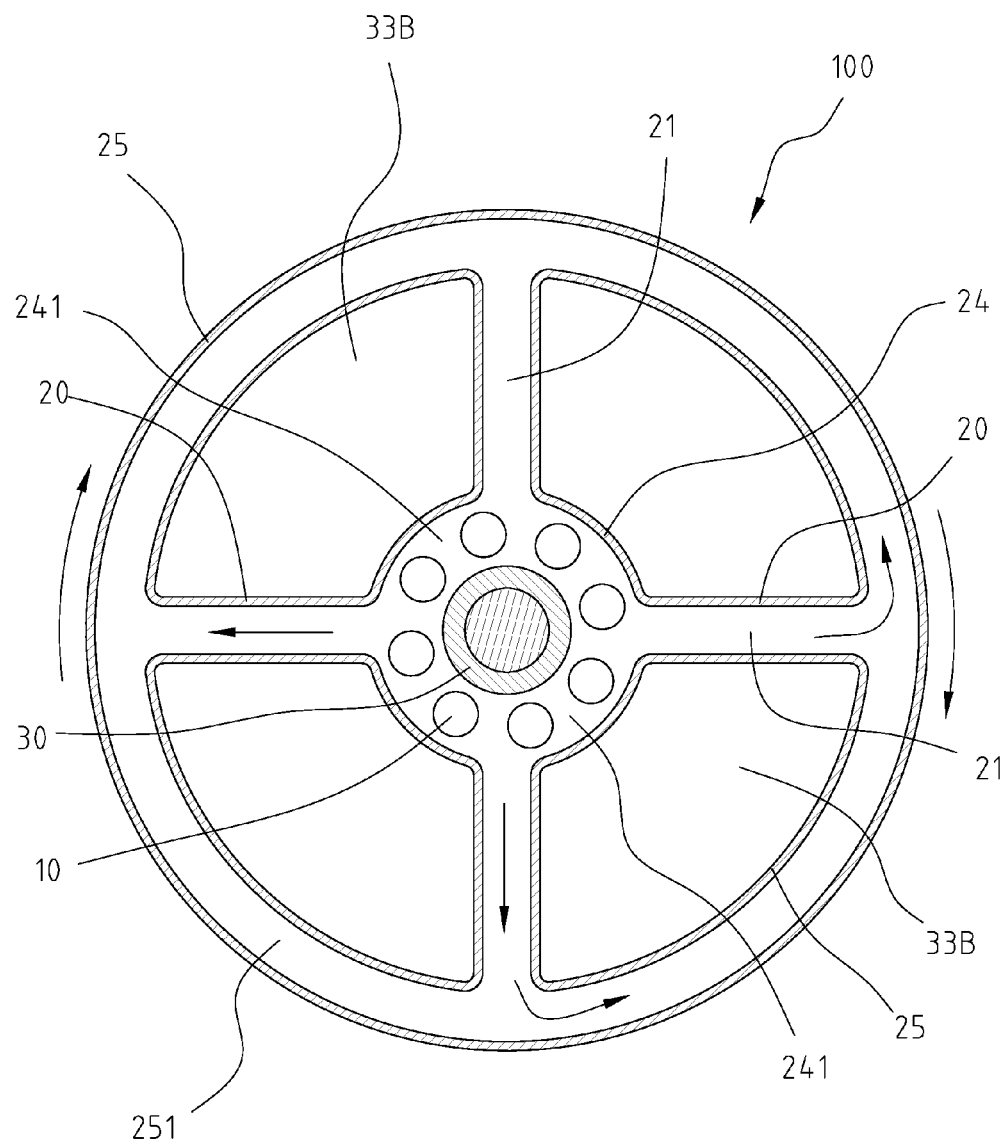
FIG. 8 shows a cross-sectional view of the fourth embodiment of the present invention.

FIG. 8 shows the fourth embodiment of the present invention. This embodiment further includes a plurality of first fixing elements 33B, a first auxiliary guiding element 24 and a second auxiliary guiding element 25, in addition to a plurality of guiding units 20, a plurality of rolling units 10 and an engaging unit 30. First fixing elements 33B are engaged between adjacent guiding units 20. First auxiliary guiding element 24 is located close to the center area of apparatus 100, and second auxiliary guiding element 25 is located close to the edge of the circumference of apparatus 100. First auxiliary guiding element 24 includes a first guiding space 241. First guiding space 241 is a ring-shaped closed space, but is connected to the front part of housing spaces 21 of guiding units 20 close to the center of apparatus 100. Second auxiliary guiding element 25 includes a second guiding space 251. Second guiding space 251 is a ring-shaped closed space, but is connected to the rear part of housing spaces 21 of guiding units 20 close to the edge of circumference of apparatus 100. Rolling units 10 are located inside first guiding space 241. When apparatus 100 is rotated with the wind turbine rotor, rolling units 10 initially roll inside first guiding space 241. As apparatus 100 is rotated faster, rolling units 10 enter housing spaces 21 of guiding units 20. As apparatus 100 is rotated even faster, rolling units 10 enter second guiding space 251 and are automatically distributed evenly inside second guiding spaces 251. On the other hand, when the rotation becomes slower, rolling units 10 will roll back to first guiding space 241.

Figure 9A:
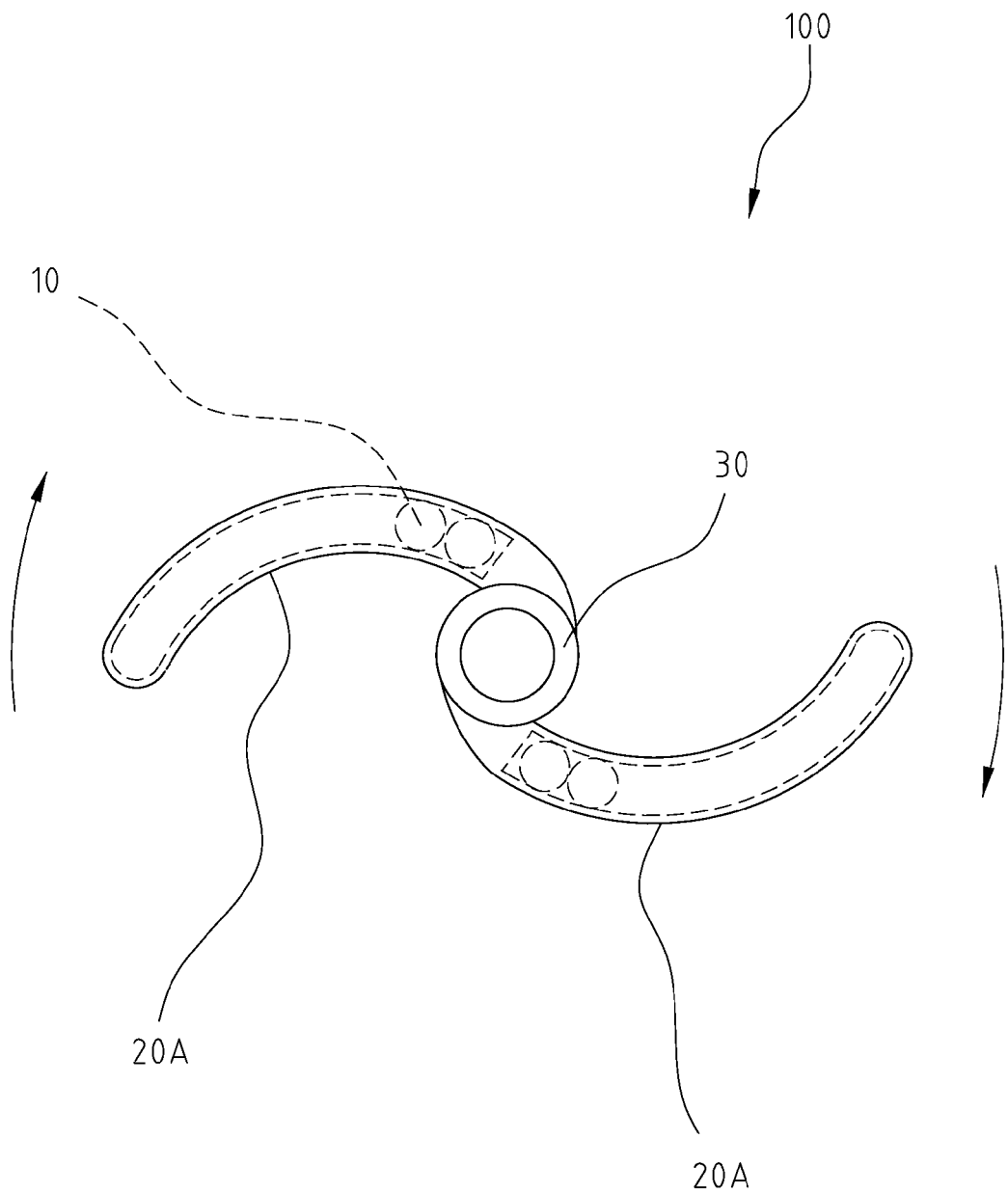
FIG. 9A shows a schematic view of the fifth embodiment of the present invention.
Figure 9B:
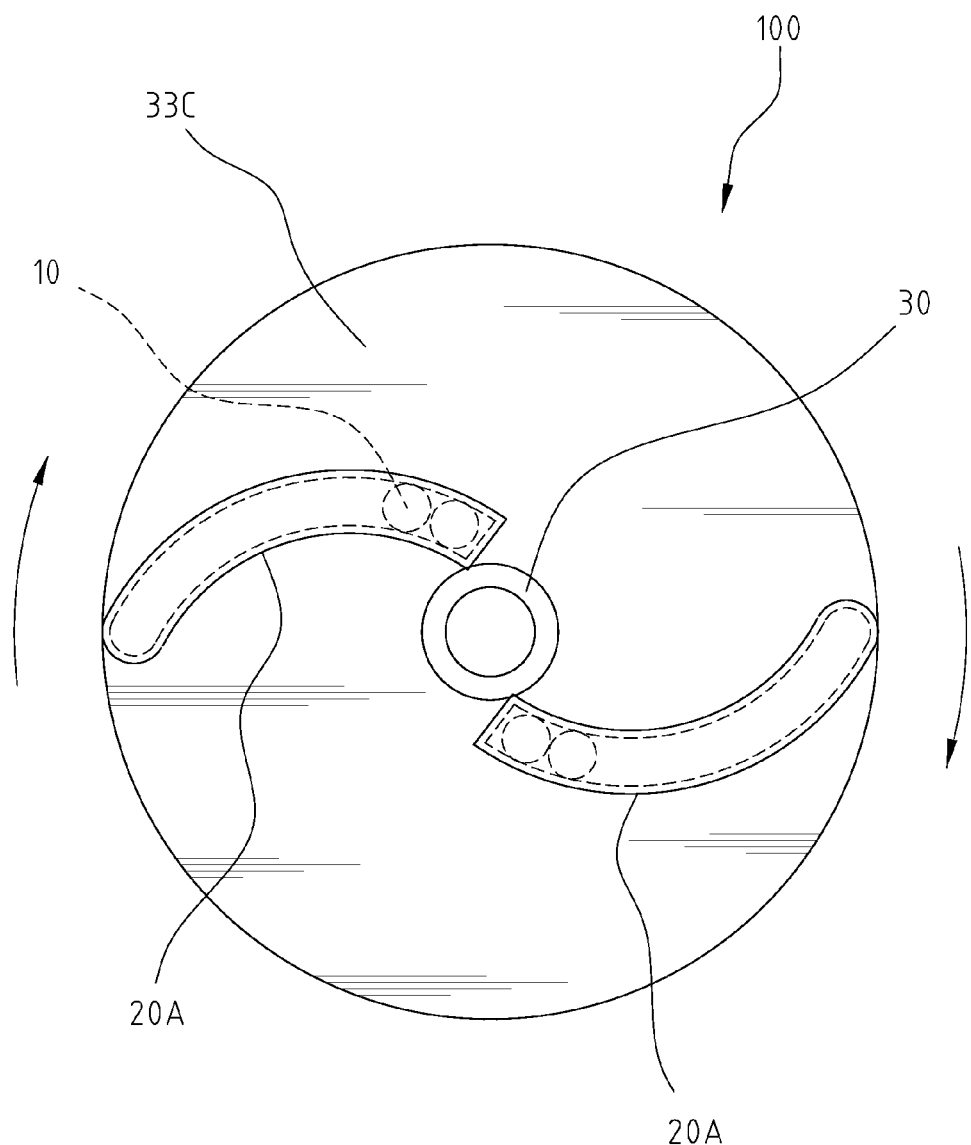
FIG. 9B shows another variety of the fifth embodiment of the present invention.
Figure 9C:
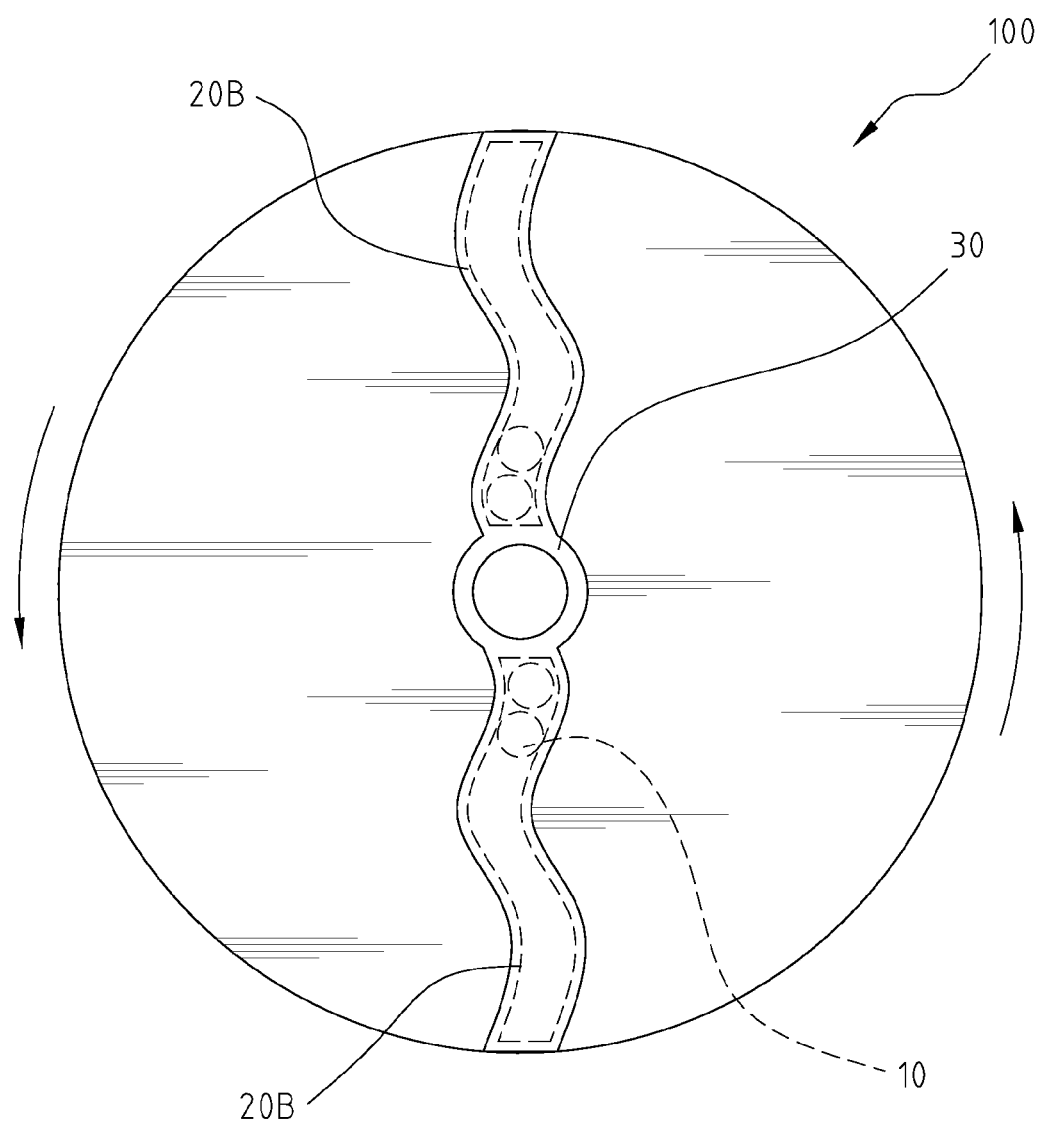
FIG. 9C shows yet another variety of the fifth embodiment of the present invention.

FIG. 9A show the fifth embodiment of the present invention. This embodiment has guiding units 20A of a different shape and structure. Guiding units 20A of this embodiment has a shape of curve extending from the center area of apparatus 100 outward to the edge of the circumference of apparatus 100. The curve of guiding units 20A is to match the curve of the blades of the wind turbine rotor. The two curves can be identical, similar or different. Guiding track 22 of each guiding unit 20A is similar to the embodiment of FIG. 1, i.e., with angle a between 0-45°. FIG. 9B shows another embodiment of FIG. 9A. This embodiment includes at least a first fixing element 33C. First fixing element 33C is engaged between two adjacent guiding units 20A to enhance the structural strength of apparatus 100. FIG. 9C shows yet another embodiment of FIG. 9A, with the curve of guiding units 20B being different from the curve of the blades of the wind turbine rotor.

Figure 10:
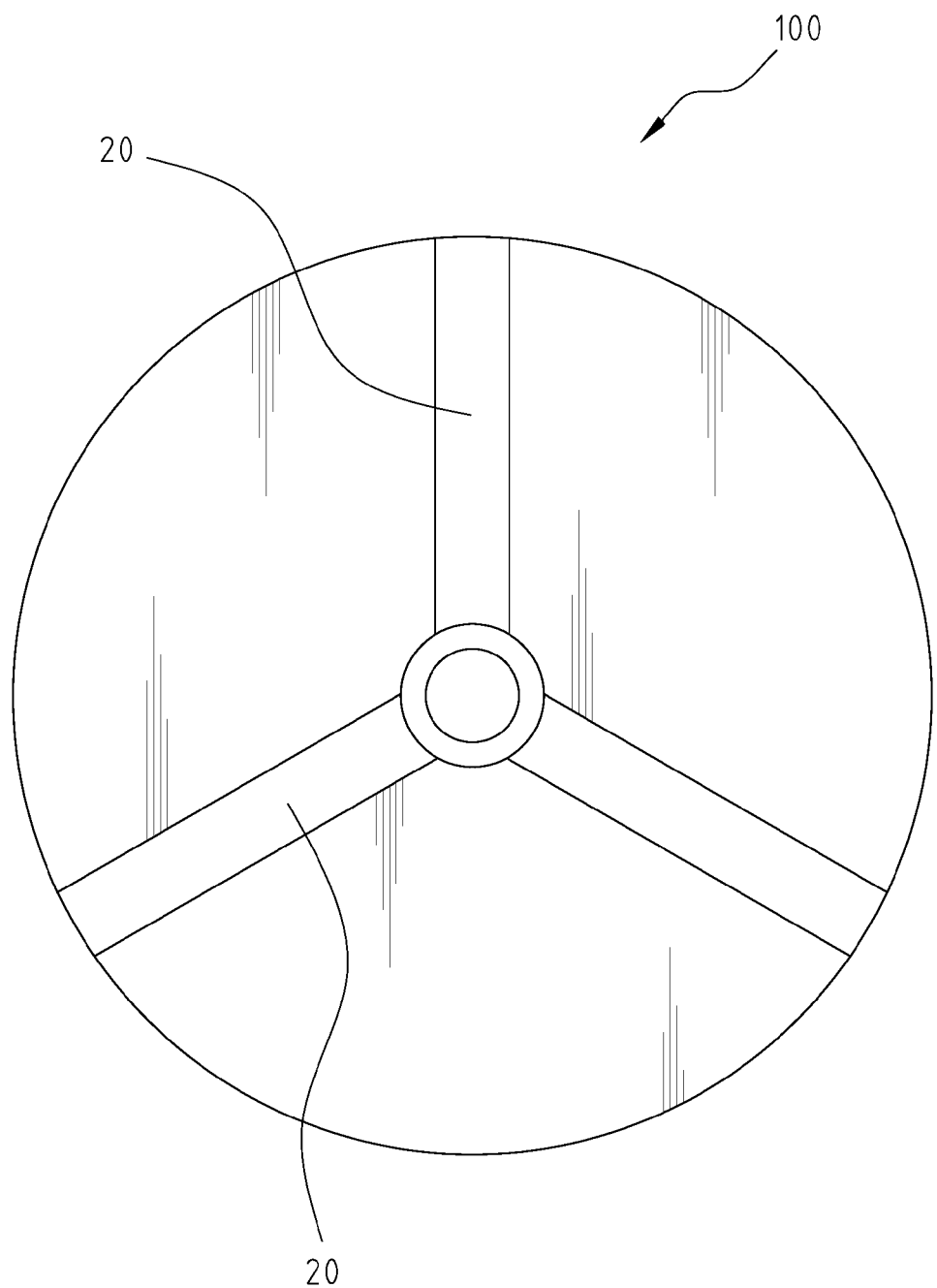
FIG. 10 shows a schematic view of the sixth embodiment of the present invention.

FIG. 10 shows the sixth embodiment of the present invention. This embodiment includes a different number of guiding units 20. The present invention at least includes two guiding units 20. The embodiment of FIG. 1 includes four guiding units 20 arranged as two adjacent guiding units with 90° apart. The embodiment of FIG. 9A includes two guiding units 20, with 180° apart. The embodiment of FIG. 10 includes three guiding units 20, arranged as two adjacent guiding units with 120° apart. Therefore, the number of guiding units 20 of the present invention is not limited to the details described thereof as long as the guiding units are symmetrically arranged to maintain balance of the wind turbine rotor.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A stabilizing apparatus, applicable to a wind turbine rotor of a vertical axis wind turbine (VAWT), said stabilizing apparatus comprising:
at least two rolling units;
at least two guiding units, symmetrically arranged, each said guiding unit extending from a center area of said stabilizing apparatus outward to an edge of circumference of said stabilizing apparatus, each said guiding unit having a housing space inside, with said rolling units evenly distributed inside the housing spaces, an inner wall of each said guiding unit at a bottom of said housing space forming a guiding track, said guiding track extending from the center area of said stabilizing apparatus outward to the edge of the circumference of said stabilizing apparatus, a line connecting starting and ending points of said guiding track forming an angle of 0-45° to a horizon surface, said rolling units rolling along the guiding tracks towards the edge of the circumference of said stabilizing apparatus because of centripetal force when said stabilizing apparatus is rotated with said wind turbine rotor, rotational inertia of said wind turbine rotor being changed as a distance between said rolling units and a center point of said stabilizing apparatus so as to achieve stabilizing rotation of said wind turbine rotor and easy starting of said wind turbine rotor; and
at least an engaging unit, for engaging said guiding units and fixing relative positions between said guiding units;
wherein said rolling units are solid balls.

2. The apparatus as claimed in claim 1, wherein said rolling units are metal balls.

3. The apparatus as claimed in claim 1, wherein the guiding tracks inside said guiding units do not pass the center point of said apparatus.

4. The apparatus as claimed in claim 1, wherein a trajectory of each said guiding unit extending from close to the center area of said apparatus outward to the edge of the circumference of said apparatus is a straight line.

5. The apparatus as claimed in claim 1, wherein said guiding track of said guiding unit is a flat surface.

6. The apparatus as claimed in claim 1, wherein said guiding track of said guiding unit is a slant surface forming an angle of 0-45° to the horizon surface.

7. The apparatus as claimed in claim 1, wherein said engaging unit is located at the center area of said apparatus to fix the relative position among said guiding units.

8. The apparatus as claimed in claim 1, wherein said engaging unit is located between two adjacent said guiding units to fix the relative position between said adjacent guiding units.

9. The apparatus as claimed in claim 1, wherein an end part of said guiding unit is further connected to an extending unit, said extending unit has an arc shape and an arc space inside, and said arc space is connected to said housing space of said guiding unit so that said rolling units can roll from said housing space into said arc space of said extending unit.

10. The apparatus as claimed in claim 1, wherein said apparatus further comprises a first auxiliary guiding element and a second auxiliary guiding element, said first auxiliary guiding element is located close to the center area of said apparatus and said second auxiliary guiding element is located close to the edge of the circumference of said apparatus, said first auxiliary guiding element has a first guiding space, said first guiding space is ring-shaped closed space connected to a front part of said housing space of said guiding unit close to the center area of said apparatus, said second auxiliary guiding element has a second guiding space, and said second guiding space is ring-shaped closed space connected to a rear part of said housing space of said guiding unit close to the edge of the circumference of said apparatus.

11. The apparatus as claimed in claim 1, wherein said apparatus is installed at a top part of said wind turbine rotor of said VAWT.

12. The apparatus as claimed in claim 1, wherein said apparatus is installed at a bottom part of said wind turbine rotor of said VAWT.

13. The apparatus as claimed in claim 1, wherein said apparatus is installed on a shaft between a top part and a bottom part of said wind turbine rotor of said VAWT.

14. The apparatus as claimed in claim 1, wherein said apparatus is installed between two stacked said wind turbine rotors when a plurality of said wind turbine rotors is stacked.

15. The apparatus as claimed in claim 1, wherein said engaging unit has a three-dimensional cone-shape, and said guiding units are fixed inside said engaging unit so that said guiding units and said rolling units are hidden inside said engaging unit.

16. The apparatus as claimed in claim 1, wherein said guiding track of said guiding unit is a curvy surface, and a vertical cross-sectional view of said curvy surface is a monotonically increasing curve.

17. The apparatus as claimed in claim 16, wherein said guiding track of said guiding unit further comprises a plurality of segments, with each said segment being a flat surface, a slant surface or a curvy surface.

18. The apparatus as claimed in claim 1, wherein a trajectory of each said guiding unit extending from close to the center area of said apparatus outward to the edge of the circumference of said apparatus is a curve.

19. The apparatus as claimed in claim 18, wherein said curve formed by each said guiding unit is the same as the curve of each blade of said wind turbine rotor.

20. The apparatus as claimed in claim 18 wherein said curve formed by each said guiding unit is similar to the curve of each blade of said wind turbine rotor.

21. The apparatus as claimed in claim 18, wherein said curve formed by each said guiding unit is different from the curve of each blade of said wind turbine rotor.

* * * * *